US012322996B2

(12) United States Patent
Kadirvel et al.

(10) Patent No.: US 12,322,996 B2
(45) Date of Patent: Jun. 3, 2025

(54) SYSTEMS AND METHODS FOR PROTECTING BATTERIES

(71) Applicant: Meta Platforms Technologies, LLC

(72) Inventors: Karthik Kadirvel, Cupertino, CA (US); Sachin Ramesh Chandra, Woodinville, WA (US); Ankur Gupta, Redwood City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 563 days.

(21) Appl. No.: 17/675,733

(22) Filed: Feb. 18, 2022

(65) Prior Publication Data

US 2023/0096836 A1 Mar. 30, 2023

Related U.S. Application Data (60) Provisional application No. 63/249,330, filed on Sep. 28, 2021.

(51) Int. Cl.
 *H02J 7/34* (2006.01)
 *H01M 10/44* (2006.01)
 (Continued)

(52) U.S. Cl.
 CPC ............ *H02J 7/342* (2020.01); *H01M 10/44* (2013.01); *H02J 7/00302* (2020.01);
 (Continued)

(58) Field of Classification Search
 CPC .......... H02J 7/342; H02J 7/007; H02J 7/0049; H02J 7/00309; H02J 7/00302;
 (Continued)

(56) References Cited

U.S. PATENT DOCUMENTS 9,118,193 B2 * 8/2015 Yeh ..................... H02J 7/00302
9,812,878 B1 * 11/2017 Stieber .................... H02J 7/007
(Continued)

FOREIGN PATENT DOCUMENTS

WO 2006095352 A2 9/2006

OTHER PUBLICATIONS

International Preliminary Report on Patentability for International Application No. PCT/US2022/044633, mailed Apr. 11, 2024, 6 pages.

(Continued)

*Primary Examiner* — Edward Tso
*Assistant Examiner* — Aaron Piggush
(74) *Attorney, Agent, or Firm* — McDermott Will & Emery LLP (57) ABSTRACT

The disclosed computer-implemented method may include (i) detecting a battery condition of a wearable battery-operated device that indicates a threat to a battery's health and (ii) in response to detecting the battery condition, performing a battery-protection action by initiating a reverse power flow across a bidirectional connection from the wearable battery-operated device to a portable charging case that is designed to charge the wearable battery-operated device. Various other methods, systems, and computer-readable media are also disclosed.

20 Claims, 6 Drawing Sheets

(51) Int. Cl.
 *H02J 7/00* (2006.01)
 *H04R 1/10* (2006.01)
(52) U.S. Cl.
 CPC ........ *H02J 7/00309* (2020.01); *H02J 7/0049* (2020.01); *H02J 7/007* (2013.01); *H04R 1/1025* (2013.01); *H01M 2220/30* (2013.01); *H04R 1/1016* (2013.01)
(58) Field of Classification Search
 CPC ............ H01M 10/44; H01M 10/0525; H01M 2220/30; H04R 1/1016; H04R 1/1025
 USPC ................. 320/103, 108, 115, 134, 136, 152
 See application file for complete search history.

(56) References Cited

U.S. PATENT DOCUMENTS

| | | | | |
|---|---|---|---|---|
| 2008/0284370 | A1* | 11/2008 | Manor .................... | H02J 7/342 320/103 |
| 2016/0056650 | A1* | 2/2016 | Hall ........................ | H02J 7/342 320/114 |
| 2017/0093454 | A1* | 3/2017 | Chawan ................ | H02J 7/0044 |
| 2019/0115766 | A1 | 4/2019 | Rechel et al. | |
| 2021/0181517 | A1* | 6/2021 | DeMaio ............ | H01M 10/0436 |

OTHER PUBLICATIONS

International Search Report and Written Opinion for International Application No. PCT/US2022/044633, mailed Jan. 23, 2023, 7 pages.

* cited by examiner

SYSTEMS AND METHODS FOR PROTECTING BATTERIES

CROSS REFERENCE TO RELATED APPLICATION

This application claims priority to provisional U.S. Application No. 63/249,330, filed Sep. 28, 2021, the disclosure of which is incorporated, in its entirety, by this reference.

DETAILED DESCRIPTION OF EXEMPLARY EMBODIMENTS

Wearable battery-operated devices such as true wireless stereo headsets and smart glasses are typically stored and carried in portable charging cases. These cases often have a battery in them that charges the respective product when the product is stored. The batteries of these cases are charged by connecting to a wall adapter or universal serial bus power adapter. The capacity of the case batteries are sized to charge the main device battery multiple times. In the charging cases, the product is typically fully charged to enable a positive customer experience when the device is taken out of the box. Wearable products, by their nature, are exposed to high temperatures when used outdoors, when left inside an automobile, when used near a swimming pool, etc.

The batteries used in these products leverage Li-ion battery chemistry because such batteries have high energy density. Li-ion batteries undergo degradation, such as swelling and permanent capacity loss when they are stored in a fully charged state and this phenomenon is exacerbated at high temperatures. One solution to address the capacity loss is to reduce the battery voltage. The battery voltage is reduced by turning on a certain load in the product to consume the battery energy. One such example is to run the main processor for a certain period of time to reduce the battery voltage from, for example, 4.4 V to 4.2 V.

Nevertheless, the solution outlined above may create a number of problems. First, precious energy in the main product is wasted as heat. Second, heat produced in the load, such as a processor, leads to localized hotspots which reduce product reliability. Third, the solution may not be feasible if the product is itself hot.

The present application is directed to an improved solution to the problems outlined above. Generally speaking, this application discloses technology that may address the detected increase in temperature that threatens to degrade the battery, as in the related system (see FIG. 3, discussed further below), but does so by transferring energy back to the portable charging case from the wearable battery-operated device, rather than by wastefully running the main processor to dissipate energy as heat. The technology of this application may achieve these benefits by establishing a bidirectional power flow between the portable charging case and the wearable battery-operated device. Thus, when high temperature is detected that threatens to cause degradation of the batteries, the bidirectional power flow may be used to transfer energy back to the portable charging case, rather than wastefully running the main processor. This solution may considerably reduce the temperature increase that is associated with charging and furthermore overcome all of the three problems listed above and associated with the related system that wastefully operates the main processor.

Figure 1:
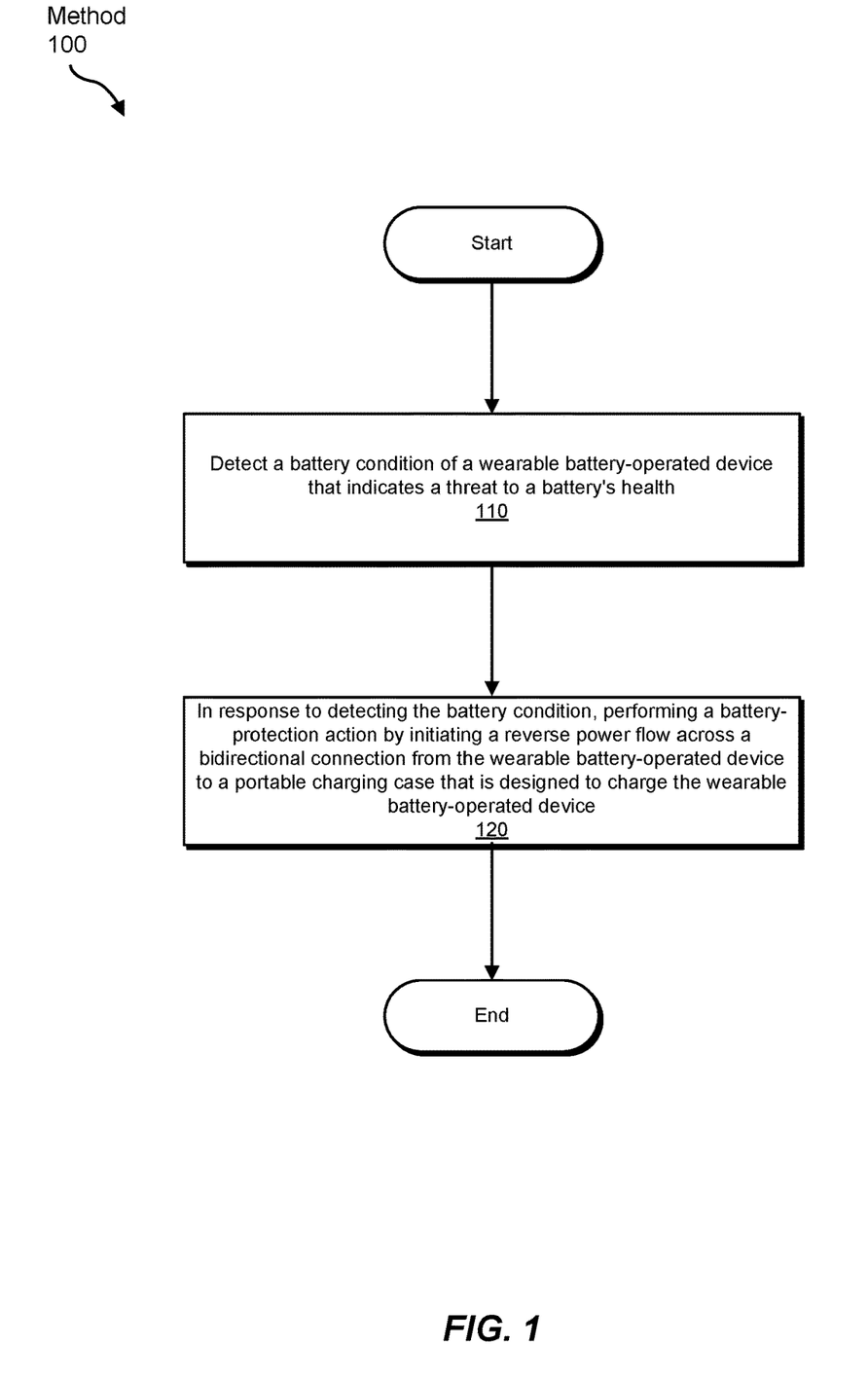
FIG. 1 is a flow diagram of an example method for protecting batteries.
Figure 2:
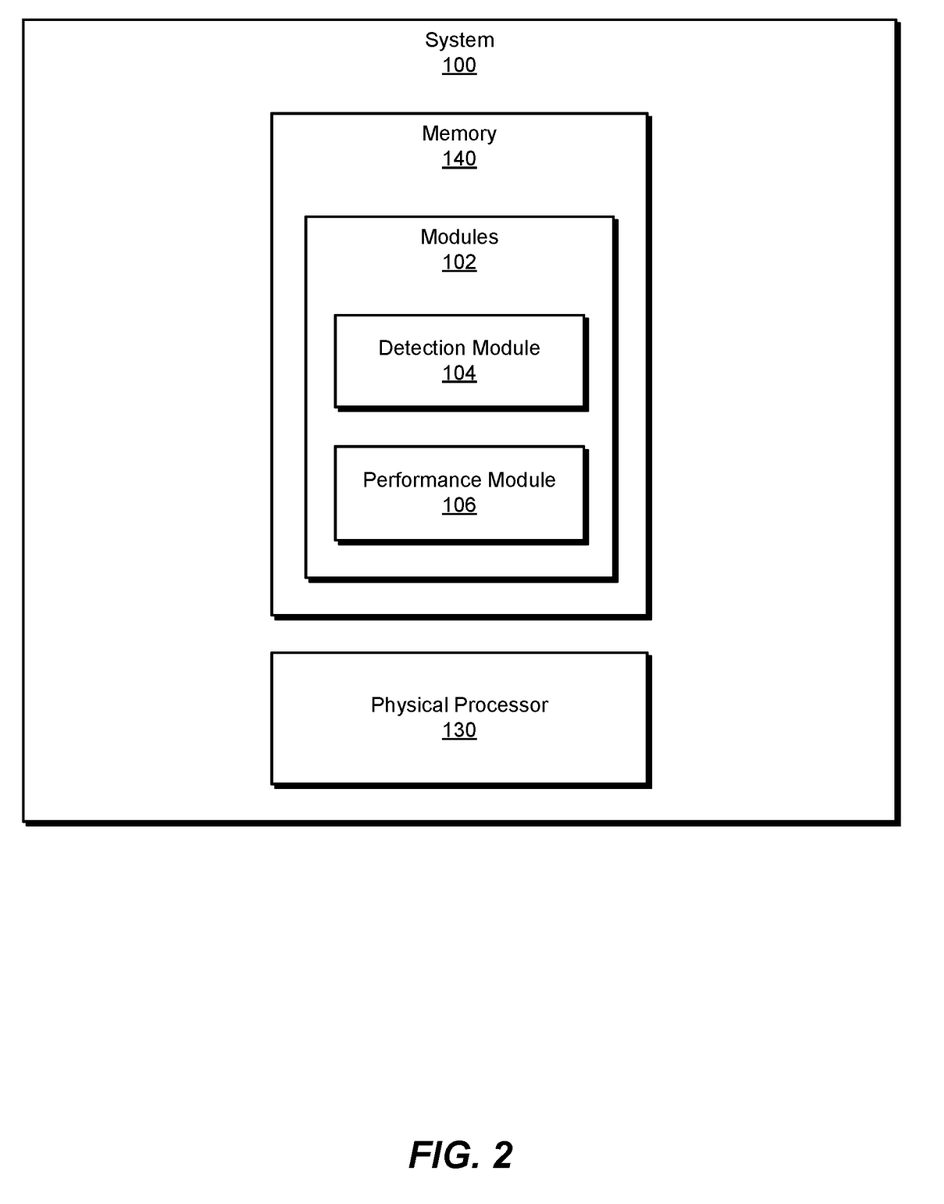
FIG. 2 is a block diagram of an example system for protecting batteries.

The following will provide, with reference to FIGS. 1-4, detailed descriptions of systems and methods for protecting batteries. FIG. 1 is a flow diagram of an example method 100 for protecting batteries. The steps shown in FIG. 1 may be performed by any suitable computer-executable code and/or computing system, including system 200 in FIG. 2, which further includes modules 102, a memory 140, and a physical processor 130. In one example, each of the steps shown in FIG. 1 may represent an algorithm whose structure includes and/or is represented by multiple sub-steps, examples of which will be provided in greater detail below. In some examples, one or more instances of modules 102 may be disposed within the wearable battery-operated device and/or the portable charging case, as further discussed below.

As illustrated in FIG. 1, at step 110 one or more of the systems described herein may detect a battery condition of the wearable battery-operated device that indicates a threat to a battery's health. For example, at step 110, a detection module 104 may detect a battery condition of the wearable battery-operated device that indicates a threat to a battery's health.

Detection module 104 may detect a battery condition of the wearable battery-operated device that indicates a threat to a battery's health in a variety of ways. Generally speaking, the wearable battery-operated device may correspond to any wearable device that a user may wear and that is operated at least in part on battery power. Illustrative examples of such wearable battery-operated devices may include earbuds, a true wireless stereo headset, a head-mounted display, and/or smart glasses. Other illustrative examples of such wearable battery-operated devices may include smart clothing, e-textiles, smart watches, smart rings, wearable computers, and/or smart shoes, for example.

Because the wearable battery-operated device consumes battery power, the battery-operated device may eventually deplete some or all of its charge, and this may be addressed through the portable charging case, as discussed above. In contrast to systems that may charge a battery-operated device by plugging the battery-operated device directly into a wall socket and/or connecting the battery-operated device to a generally stationary charger, method 100 may refer to a wearable battery-operated device that may be charged in a carrying case that further functions as a charging case. In other words, a wearable battery-operated device may be disposed within a portable charging case that itself contains a battery, such that the wearable battery-operated device may be charged even while the user carries the device from place to place within the portable charging case.

In one example, either or both of the wearable battery-operated device and the portable charging case may operate using a Li-ion battery. Nevertheless, the battery of the portable charging case may be substantially larger than the battery of the wearable battery-operated device. For example, the battery of the portable charging case may optionally be sized to charge a battery of the wearable battery-operated device multiple times. Furthermore, although the wearable battery-operated device may be designed to draw charge from the portable charging case (and vice versa according to method 100), the portable charging case itself may be configured to draw charge through a wall adapter or universal serial bus adapter, for example.

Figure 3:
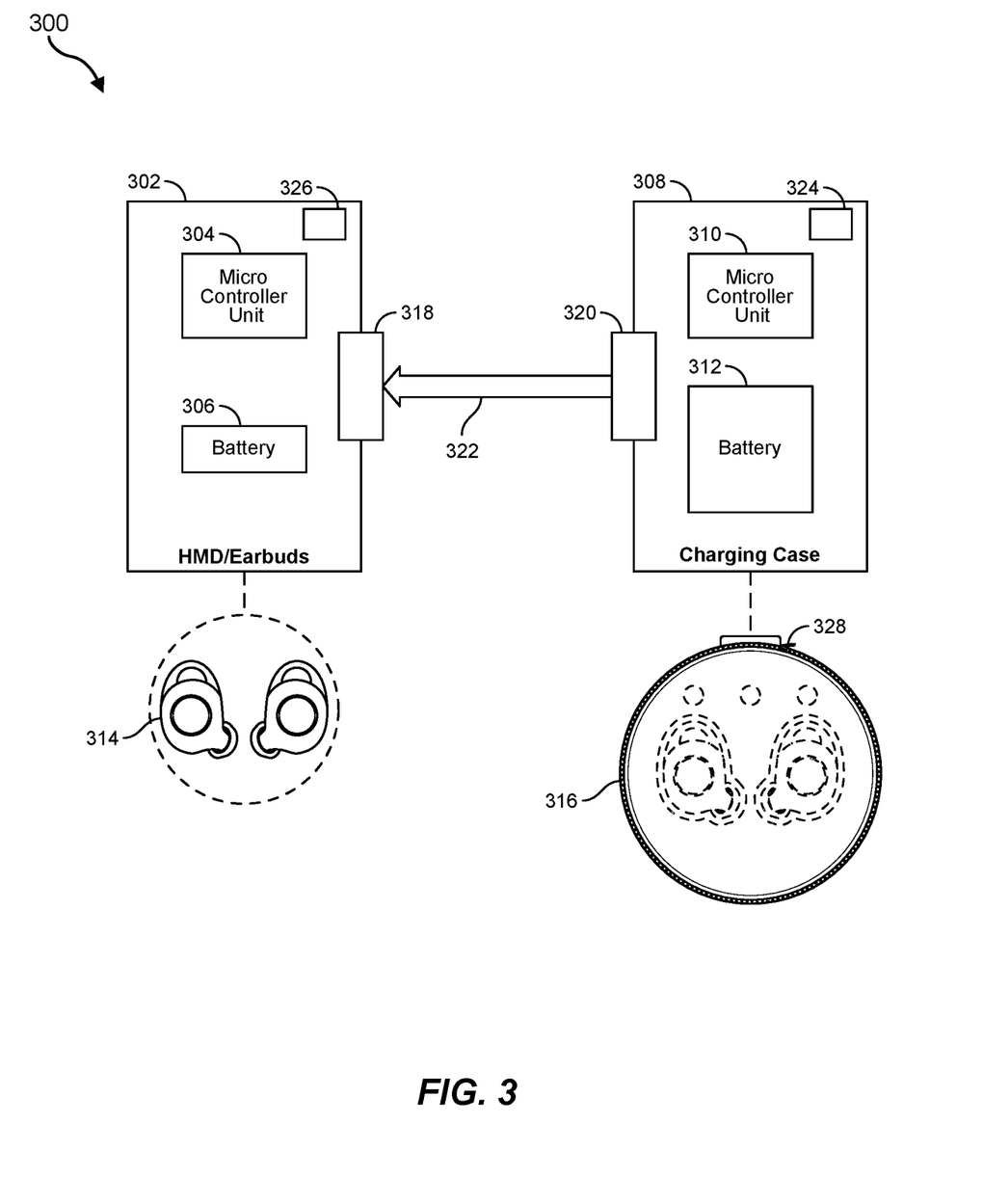
FIG. 3 is a diagram of a related system for protecting batteries.

FIG. 3 shows a diagram of a system including a wearable battery-operated device 302 and a portable charging case 308. In the example of this figure, the wearable battery-operated device may correspond to a head-mounted display or earbuds. Both the wearable battery-operated device and the portable charging case may include a microcontroller unit 304, 310 and/or a battery 306, 312 such as a Li-ion battery. Although this example features a microcontroller unit, in other examples a corresponding physical processor may include a microprocessor, a system on a chip, or a computing chip. Similarly, although this example features a Li-ion battery, in other examples any suitable battery may be used, including for example lead-acid batteries, nickel-cadmium batteries, nickel-metal hydride batteries, nickel-zinc batteries, lithium-ion polymer batteries, and alkaline batteries. This figure also further illustrates how the battery of the portable charging case may be substantially larger than the battery for the corresponding wearable battery-operated device.

Moreover, this figure also illustrates how the wearable battery-operated device and/or the portable charging case may include a corresponding sensor 324, 326. The sensor may be used to detect the battery condition that poses a threat to a corresponding battery's health, in accordance with step 110. For example, the condition may correspond to the battery being fully charged or substantially fully charged, which may potentially degrade the performance of the battery over time, as discussed above. Additionally, or alternatively, the condition may correspond to a high temperature, such as a temperature beyond a certain threshold. The temperature may refer to the temperature of the battery itself (e.g., the battery within the wearable battery-operated device and/or the battery within the portable charging case), the temperature of (or within) the corresponding device (e.g., the wearable battery having operated device and/or the portable charging case), and/or an ambient or external temperature in which the corresponding devices disposed. A high temperature condition may further exacerbate degradation that is caused by the battering being fully charged. Thus, in certain examples, detection module 104 may detect a fully charged state of the battery and may further detect a high temperature, and in response may detect the conjunction of these two signals such that the conjunction indicates the corresponding battery condition that poses a threat to battery health. In other examples, the battery condition may correspond to any other one or more detectable scenarios that predictably pose a threat to battery health, longevity, or performance.

For illustrative purposes, FIG. 3 also further shows a more realistic and detailed diagram 314 of earbuds as one example of the wearable battery-operated device. Additionally, this figure also further shows a more realistic and detailed diagram 316 of a circular portable charging case (including a zipper 328), in which the earbuds may be stored, carried, and/or charged in accordance with method 100.

FIG. 3 also includes a centralized unidirectional arrow 322 that points, between a connection port 318 and a connection port 320, in the direction from the portable charging case to the wearable battery-operated device. This figure thereby helps illustrate how this related system may operate using a unidirectional power flow configuration that performs charging exclusively, or substantially exclusively, in one direction from the portable charging case to the wearable battery-operated device. The unidirectional power flow may be achieved through a power cord or through metal or other contacts touching between the wearable battery-operated device and the portable charging case when the device is resting within the case. For example, the system of this figure may operate according to the methodology described above, whereby, in response to the sensor detecting high temperature, the main processor is operated to wastefully draw charge from the portable charging case and thereby reduce the voltage from 4.4 V to 4.2 V. The methodology of this figure may therefore be associated, in some cases, with one or more of the three problems listed above (e.g., battery performance degradation due to a fully charged state and/or high temperature).

Returning to FIG. 1, at step 120 one or more of the systems described herein may, in response to detecting the battery condition, perform a battery-protection action by initiating a reverse power flow across a bidirectional connection from the wearable battery-operated device to a portable charging case that is designed to charge the wearable battery-operated device. For example, at step 120, a performance module 106 may, in response to detecting the battery condition, perform a battery protection action by initiating a reverse power flow across a bidirectional connection from the wearable battery-operated device to a portable charging case that is designed to charge the wearable battery-operated device.

Performance module 106 may perform step 120 in a variety of ways. For example, performance module 106 may be programmed as a part of a microcontroller unit of the wearable battery-operated device and/or the portable charging case to trigger power flow back to the portable charging case from the wearable battery-operated device, across a bidirectional connection, in response to detecting high temperature and/or detecting a fully charged state of the battery, as further discussed above. Generally speaking, performance module 106 may detect the battery condition in response to detection module 104 performing step 110 (e.g., through a message or signal sent from detection module 104 to performance module 106). Detection module 104 may have been configured to detect one or more battery conditions, including one or more of the illustrative examples of battery conditions that are listed above. In response to detecting the battery condition, the wearable battery-operated device and/or the portable charging case may also have been configured to respond by activating the drawing of charge from the wearable battery-operated device to the portable charging case across the bidirectional connection.

Figure 4:
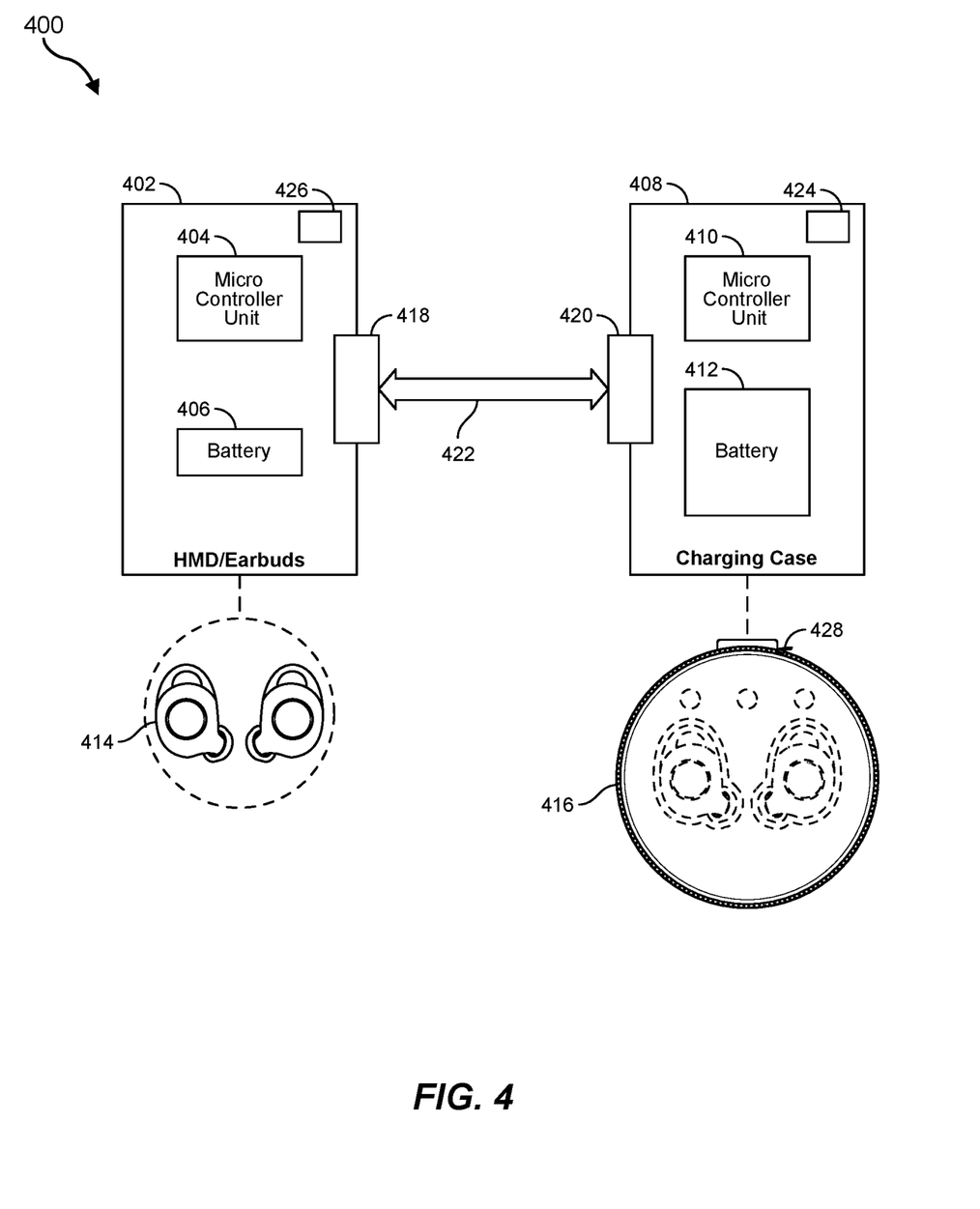
FIG. 4 is a diagram of an improved system for protecting batteries.

FIG. 4 shows an updated version of the system from FIG. 3 in which the connection between the wearable battery-operated device and the portable charging case has been configured to provide bidirectional power flow enabling the reversed charging procedure that is described above. Moreover, the reference numerals from FIG. 3 have been updated to recite essentially parallel reference numerals in FIG. 4 for matching elements between these two figures (e.g., wearable battery-operated device 302 corresponds to wearable battery-operated device 402).

As further shown in this figure, the unidirectional arrow 322 of FIG. 3 from the portable charging case to the wearable battery-operated device has been replaced with a bidirectional arrow 422. Consistent with the above description, the bidirectional arrow further indicates that, in addition to the larger battery of the portable charging case providing charge for the wearable battery-operated device during normal charging conditions, the system of this figure also has the ability to reverse the direction of charging under certain circumstances (e.g., the detection of high temperature and/or full battery charge), thereby enabling a corresponding processor (e.g., microcontroller unit 404 and/or 410) to intelligently activate the reversal of direction in a manner that protects either or both of the batteries, prevents degradation of these batteries, and/or prevents a further increase in temperature, for example. The further temperature increase may be prevented due to the battery of the portable charging case having substantially higher capacity than a battery of the wearable battery-operated device, as further discussed above.

Configuring the connection to transfer energy back to the portable charging case may provide a number of benefits and improvements over the related methodology of FIG. 3. For example, configuring the wearable battery-operated device to transfer energy back to the portable charging case preserves energy rather than dissipating energy. Furthermore, configuring the wearable battery-operated device to transfer energy back to the portable charging case eliminates a procedure for turning on a load within the wearable battery-operated device to consume energy such that a voltage is lowered from 4.4 V to 4.2 V. Additionally, configuring the wearable battery-operated device to transfer energy back to the portable charging case reduces a temperature increase associated with charging. As further discussed above, a Li-ion battery of the wearable battery-operated device or the portable charging case has a structure that undergoes degradation in response to being stored in a fully charged state. Accordingly, the improved system of FIG. 4 may further provide the benefit of facilitating the minimization of the fully charged state, thereby helping to prevent the associated battery degradation.

Example Embodiments

Example 1: An apparatus may include an apparatus may include a physical processor and at least one physical memory connected to the physical processor and storing instructions that, when executed by the physical processor, cause the physical processor to perform a method including (i) detecting a battery condition of a wearable battery-operated device that indicates a threat to a battery's health and (ii) in response to detecting the battery condition, performing a battery-protection action by initiating a reverse power flow across a bidirectional connection from the wearable battery-operated device to a portable charging case that is designed to charge the wearable battery-operated device, such that a configuration of the bidirectional connection enables the wearable battery-operated device to charge the portable charging case instead of a unidirectional power flow where power flows exclusively from the portable charging case to the wearable battery-operated device.

Example 2: The apparatus of Example 1, where the battery condition that indicates the threat to the battery's health includes at least one of (i) that the wearable battery-operated device has exceeded a threshold temperature, (ii) that the battery has exceeded the threshold temperature, or (iii) that the battery is fully charged.

Example 3: The apparatus of any of Examples 1 and 2 where the wearable battery-operated device includes at least one of earbuds, a true wireless stereo headset, a head-mounted display, or smart glasses.

Example 4: The apparatus of any of Examples 1-3 where a battery of the portable charging case is substantially larger than the battery of the wearable battery-operated device.

Example 5: The apparatus of any of Examples 1-4 where the reverse power flow is configured to return energy back to the portable charging case.

Example 6: The apparatus of any of Examples 1-5 where the reverse power flow being configured to return energy back to the portable charging case prevents a loss of energy as heat.

Example 7: The apparatus of any of Examples 1-6 where the wearable battery-operated device operates using a Li-ion battery.

Example 8: The apparatus of any of Examples 1-7 the portable charging case operates using a Li-ion battery.

Example 9: The apparatus of any of Examples 1-8 wherein a battery of the portable charging case is sized to charge a battery of the wearable battery-operated device multiple times.

Example 10: The apparatus of any of Examples 1-9 wherein the portable charging case is configured to charge by connecting to a wall adapter.

Example 11: A computer-implemented method may include (i) detecting a battery condition of a wearable battery-operated device that indicates a threat to a battery's health and (ii) in response to detecting the battery condition, performing a battery-protection action by initiating a reverse power flow across a bidirectional connection from the wearable battery-operated device to a portable charging case that is designed to charge the wearable battery-operated device, where a configuration of the bidirectional connection enables the wearable battery-operated device to charge the portable charging case instead of a unidirectional power flow where power flows exclusively from the portable charging case to the wearable battery-operated device.

Example 12: The computer-implemented method of Example 11 where the battery condition that indicates the threat to the battery's health includes at least one of (i) that the wearable battery-operated device has exceeded a threshold temperature, (ii) that the battery has exceeded the threshold temperature, or (iii) that the battery is fully charged.

Example 13: The computer-implemented method of any of Examples 11-12 where the wearable battery-operated device includes at least one of earbuds, a true wireless stereo headset, a head-mounted display, or smart glasses.

Example 14: The computer-implemented method of any of Examples 11-13 where a battery of the portable charging case is substantially larger than the battery of the wearable battery-operated device.

Example 15: The computer-implemented method of any of Examples 11-14 where the reverse power flow is configured to return energy back to the portable charging case.

Example 16: The computer-implemented method of any of Examples 11-15 where the reverse power flow being configured to return energy back to the portable charging case prevents a loss of energy as heat.

Example 17: The computer-implemented method of any of Examples 11-16 where the wearable battery-operated device operates using a Li-ion battery.

Example 18: The computer-implemented method of any of Examples 11-17 where the portable charging case operates using a Li-ion battery.

Example 19: The computer-implemented method of any of Examples 11-18 where a battery of the portable charging case is sized to charge a battery of the wearable battery-operated device multiple times.

Example 20: A system may include (i) a portable charging case that is designed to charge a wearable battery-operated device while storing the wearable battery-operated device and (ii) the wearable battery-operated device, where a connection is configured to provide bidirectional power flow between the portable charging case and the wearable battery-operated device such that the wearable battery-operated device may charge the portable charging case rather than unidirectional power flow where power flows exclusively from the portable charging case to the wearable battery-operated device.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 500 in FIG. 5) or that visually immerses a user in an artificial reality (such as, e.g., virtual-reality system 600 in FIG. 6). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 5:
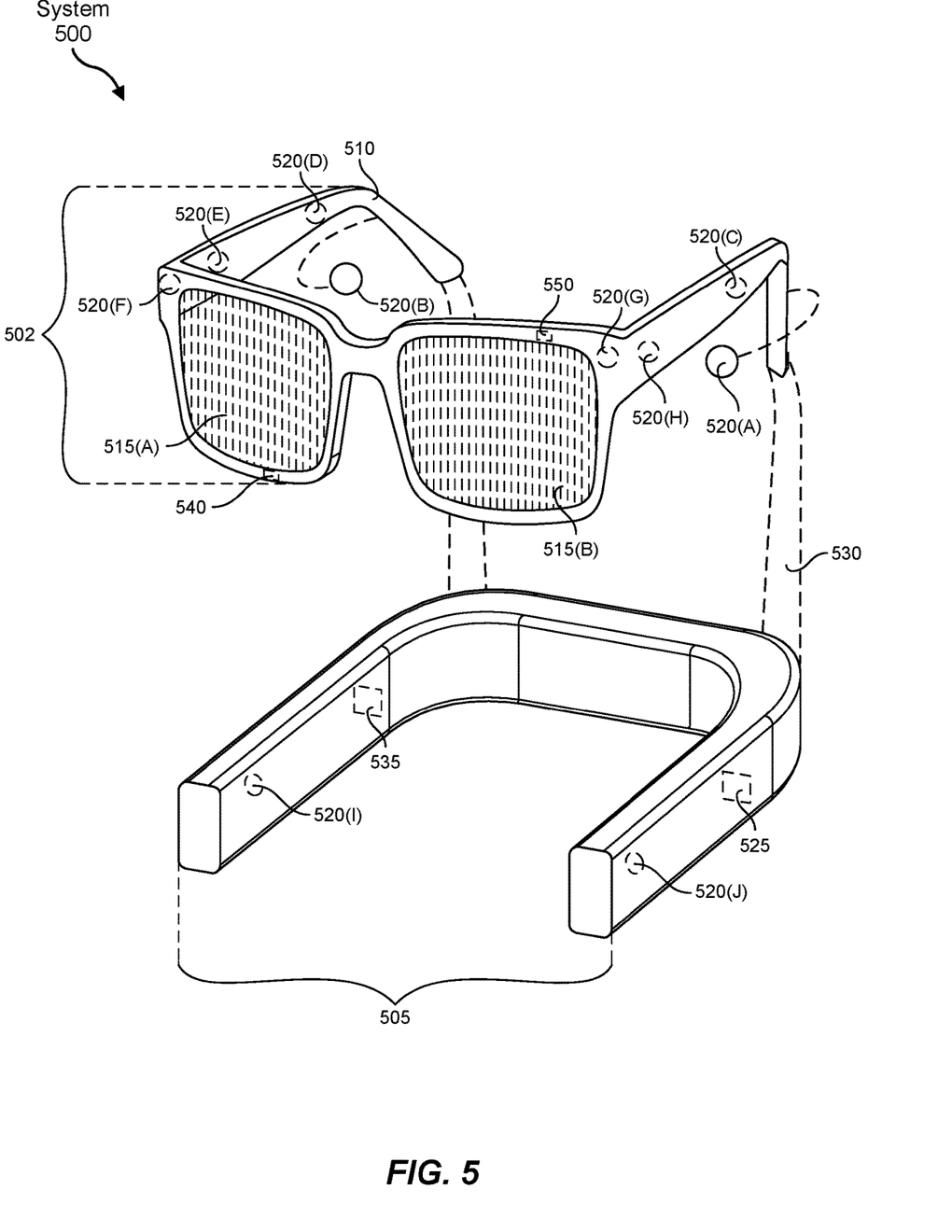
FIG. 5 is an illustration of exemplary augmented-reality glasses that may be used in connection with embodiments of this disclosure.

Turning to FIG. 5, augmented-reality system 500 may include an eyewear device 502 with a frame 510 configured to hold a left display device 515(A) and a right display device 515(B) in front of a user's eyes. Display devices 515(A) and 515(B) may act together or independently to present an image or series of images to a user. While augmented-reality system 500 includes two displays, embodiments of this disclosure may be implemented in augmented-reality systems with a single NED or more than two NEDs.

In some embodiments, augmented-reality system 500 may include one or more sensors, such as sensor 540. Sensor 540 may generate measurement signals in response to motion of augmented-reality system 500 and may be located on substantially any portion of frame 510. Sensor 540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 500 may or may not include sensor 540 or may include more than one sensor.

In embodiments in which sensor 540 includes an IMU, the IMU may generate calibration data based on measurement signals from sensor 540. Examples of sensor 540 may include, without limitation, accelerometers, gyroscopes, magnetometers, other suitable types of sensors that detect motion, sensors used for error correction of the IMU, or some combination thereof.

In some examples, augmented-reality system 500 may also include a microphone array with a plurality of acoustic transducers 520(A)-520(J), referred to collectively as acoustic transducers 520. Acoustic transducers 520 may represent transducers that detect air pressure variations induced by sound waves. Each acoustic transducer 520 may be configured to detect sound and convert the detected sound into an electronic format (e.g., an analog or digital format). The microphone array in FIG. 5 may include, for example, ten acoustic transducers: 520(A) and 520(B), which may be designed to be placed inside a corresponding ear of the user, acoustic transducers 520(C), 520(D), 520(E), 520(F), 520(G), and 520(H), which may be positioned at various locations on frame 510, and/or acoustic transducers 520(I) and 520(J), which may be positioned on a corresponding neckband 505.

In some embodiments, one or more of acoustic transducers 520(A)-(J) may be used as output transducers (e.g., speakers). For example, acoustic transducers 520(A) and/or 520(B) may be earbuds or any other suitable type of headphone or speaker.

The configuration of acoustic transducers 520 of the microphone array may vary. While augmented-reality system 500 is shown in FIG. 5 as having ten acoustic transducers 520, the number of acoustic transducers 520 may be greater or less than ten. In some embodiments, using higher numbers of acoustic transducers 520 may increase the amount of audio information collected and/or the sensitivity and accuracy of the audio information. In contrast, using a lower number of acoustic transducers 520 may decrease the computing power required by an associated controller 550 to process the collected audio information. In addition, the position of each acoustic transducer 520 of the microphone array may vary. For example, the position of an acoustic transducer 520 may include a defined position on the user, a defined coordinate on frame 510, an orientation associated with each acoustic transducer 520, or some combination thereof.

Acoustic transducers 520(A) and 520(B) may be positioned on different parts of the user's ear, such as behind the pinna, behind the tragus, and/or within the auricle or fossa. Or, there may be additional acoustic transducers 520 on or surrounding the ear in addition to acoustic transducers 520 inside the ear canal. Having an acoustic transducer 520 positioned next to an ear canal of a user may enable the microphone array to collect information on how sounds arrive at the ear canal. By positioning at least two of acoustic transducers 520 on either side of a user's head (e.g., as binaural microphones), augmented-reality device 500 may simulate binaural hearing and capture a 3D stereo sound field around about a user's head. In some embodiments, acoustic transducers 520(A) and 520(B) may be connected to augmented-reality system 500 via a wired connection 530, and in other embodiments acoustic transducers 520(A) and 520(B) may be connected to augmented-reality system 500 via a wireless connection (e.g., a BLUETOOTH connection). In still other embodiments, acoustic transducers 520(A) and 520(B) may not be used at all in conjunction with augmented-reality system 500.

Acoustic transducers 520 on frame 510 may be positioned in a variety of different ways, including along the length of the temples, across the bridge, above or below display devices 515(A) and 515(B), or some combination thereof. Acoustic transducers 520 may also be oriented such that the microphone array is able to detect sounds in a wide range of directions surrounding the user wearing the augmented-reality system 500. In some embodiments, an optimization process may be performed during manufacturing of augmented-reality system 500 to determine relative positioning of each acoustic transducer 520 in the microphone array.

In some examples, augmented-reality system 500 may include or be connected to an external device (e.g., a paired device), such as neckband 505. Neckband 505 generally represents any type or form of paired device. Thus, the following discussion of neckband 505 may also apply to various other paired devices, such as charging cases, smart watches, smart phones, wrist bands, other wearable devices, hand-held controllers, tablet computers, laptop computers, other external compute devices, etc.

As shown, neckband 505 may be coupled to eyewear device 502 via one or more connectors. The connectors may be wired or wireless and may include electrical and/or non-electrical (e.g., structural) components. In some cases, eyewear device 502 and neckband 505 may operate independently without any wired or wireless connection between them. While FIG. 5 illustrates the components of eyewear device 502 and neckband 505 in example locations on eyewear device 502 and neckband 505, the components may be located elsewhere and/or distributed differently on eyewear device 502 and/or neckband 505. In some embodiments, the components of eyewear device 502 and neckband 505 may be located on one or more additional peripheral devices paired with eyewear device 502, neckband 505, or some combination thereof.

Pairing external devices, such as neckband 505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 500 may be provided by a paired device or shared between a paired device and an eyewear device, thus reducing the weight, heat profile, and form factor of the eyewear device overall while still retaining desired functionality. For example, neckband 505 may allow components that would otherwise be included on an eyewear device to be included in neckband 505 since users may tolerate a heavier weight load on their shoulders than they would tolerate on their heads. Neckband 505 may also have a larger surface area over which to diffuse and disperse heat to the ambient environment. Thus, neckband 505 may allow for greater battery and computation capacity than might otherwise have been possible on a stand-alone eyewear device. Since weight carried in neckband 505 may be less invasive to a user than weight carried in eyewear device 502, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 505 may be communicatively coupled with eyewear device 502 and/or to other devices. These other devices may provide certain functions (e.g., tracking, localizing, depth mapping, processing, storage, etc.) to augmented-reality system 500. In the embodiment of FIG. 5, neckband 505 may include two acoustic transducers (e.g., 520(1) and 520(J)) that are part of the microphone array (or potentially form their own microphone subarray). Neckband 505 may also include a controller 525 and a power source 535.

Acoustic transducers 520(1) and 520(J) of neckband 505 may be configured to detect sound and convert the detected sound into an electronic format (analog or digital). In the embodiment of FIG. 5, acoustic transducers 520(1) and 520(J) may be positioned on neckband 505, thereby increasing the distance between the neckband acoustic transducers 520(1) and 520(J) and other acoustic transducers 520 positioned on eyewear device 502. In some cases, increasing the distance between acoustic transducers 520 of the microphone array may improve the accuracy of beamforming performed via the microphone array. For example, if a sound is detected by acoustic transducers 520(C) and 520(D) and the distance between acoustic transducers 520(C) and 520(D) is greater than, e.g., the distance between acoustic transducers 520(D) and 520(E), the determined source location of the detected sound may be more accurate than if the sound had been detected by acoustic transducers 520(D) and 520(E).

Controller 525 of neckband 505 may process information generated by the sensors on neckband 505 and/or augmented-reality system 500. For example, controller 525 may process information from the microphone array that describes sounds detected by the microphone array. For each detected sound, controller 525 may perform a direction-of-arrival (DOA) estimation to estimate a direction from which the detected sound arrived at the microphone array. As the microphone array detects sounds, controller 525 may populate an audio data set with the information. In embodiments in which augmented-reality system 500 includes an inertial measurement unit, controller 525 may compute all inertial and spatial calculations from the IMU located on eyewear device 502. A connector may convey information between augmented-reality system 500 and neckband 505 and between augmented-reality system 500 and controller 525. The information may be in the form of optical data, electrical data, wireless data, or any other transmittable data form. Moving the processing of information generated by augmented-reality system 500 to neckband 505 may reduce weight and heat in eyewear device 502, making it more comfortable to the user.

Power source 535 in neckband 505 may provide power to eyewear device 502 and/or to neckband 505. Power source 535 may include, without limitation, lithium ion batteries, lithium-polymer batteries, primary lithium batteries, alkaline batteries, or any other form of power storage. In some cases, power source 535 may be a wired power source. Including power source 535 on neckband 505 instead of on eyewear device 502 may help better distribute the weight and heat generated by power source 535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 600 in FIG. 6, that mostly or completely covers a user's field of view. Virtual-reality system 600 may include a front rigid body 602 and a band 604 shaped to fit around a user's head. Virtual-reality system 600 may also include output audio transducers 606(A) and 606(B). Furthermore, while not shown in FIG. 6, front rigid body 602 may include one or more electronic elements, including one or more electronic displays, one or more inertial measurement units (IMUS), one or more tracking emitters or detectors, and/or any other suitable device or system for creating an artificial-reality experience.

Figure 6:
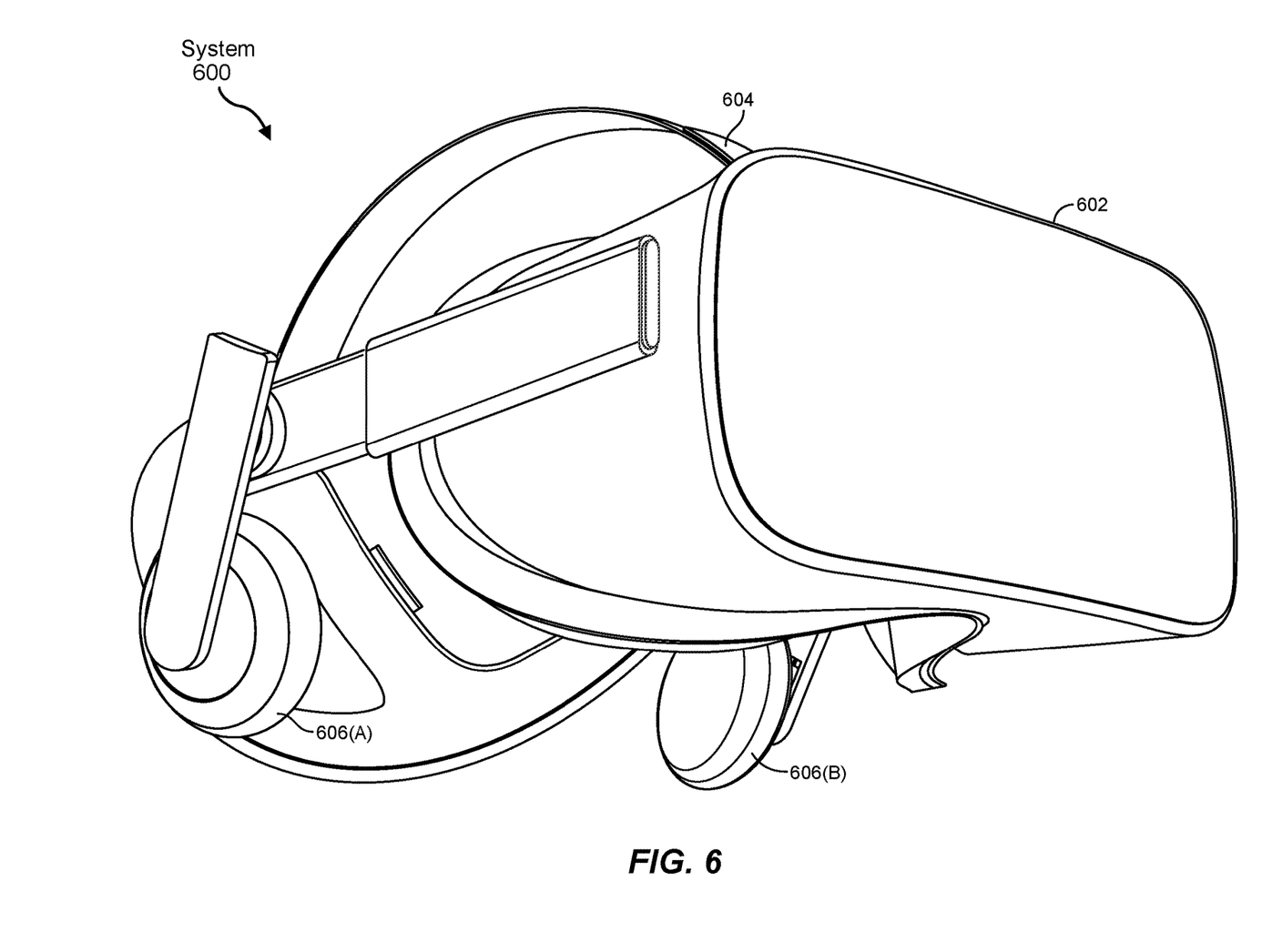
FIG. 6 is an illustration of an exemplary virtual-reality headset that may be used in connection with embodiments of this disclosure.

Artificial-reality systems may include a variety of types of visual feedback mechanisms. For example, display devices in augmented-reality system 500 and/or virtual-reality system 600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 500 and/or virtual-reality system 600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 500 and/or virtual-reality system 600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a physical processor; and
   at least one physical memory connected to the physical processor and storing instructions that, when executed by the physical processor, cause the physical processor to perform:

charging a first battery of a wearable battery-operated device using a power flow across a bidirectional connection from a second battery of a portable charging case, that is designed to charge the wearable battery-operated device, to the first battery;

detecting a battery condition of the first battery of the wearable battery-operated device that indicates a threat to the first battery's health; and in response to detecting the battery condition, performing a battery-protection action by reversing the power flow across the bidirectional connection from the first battery of the wearable battery-operated device to the second battery of the portable charging case, wherein the bidirectional connection enables the first battery of the wearable battery-operated device to return energy back to and charge the second battery of the portable charging case.

2. The apparatus of claim 1, wherein detecting the battery condition that indicates the threat to the first battery's health comprises detecting at least one of:

that the wearable battery-operated device has exceeded a threshold temperature;

that the first battery has exceeded the threshold temperature; or that the first battery is fully charged.

3. The apparatus of claim 1, wherein the wearable battery-operated device comprises at least one of earbuds, a true wireless stereo headset, a head-mounted display, or smart glasses.

4. The apparatus of claim 1, wherein a capacity of the second battery of the portable charging case is higher than a capacity of the first battery of the wearable battery-operated device.

5. The apparatus of claim 1, wherein the reverse power flow being configured to return energy back to the portable charging case prevents a loss of energy as heat.

6. The apparatus of claim 1, wherein the wearable battery-operated device operates using a Li-ion battery.

7. The apparatus of claim 1, wherein the portable charging case operates using a Li-ion battery.

8. The apparatus of claim 1, wherein the second battery of the portable charging case is sized to charge the first battery of the wearable battery-operated device multiple times.

9. The apparatus of claim 1, wherein the portable charging case is configured to charge by connecting to a wall adapter.

10. The apparatus of claim 1, wherein reversing the power flow comprises activating a drawing of charge from the wearable battery-operated device to the portable charging case across the bidirectional connection.

11. The apparatus of claim 1, wherein reversing the power flow lowers an operating voltage of the wearable battery-operated device.

12. A method comprising:

charging a first battery of a wearable battery-operated device using a power flow across a bidirectional connection from a second battery of a portable charging case, that is designed to charge the wearable battery-operated device, to the first battery;

detecting a battery condition of the first battery of the wearable battery-operated device that indicates a threat to the first battery's health; and in response to detecting the battery condition, performing a battery-protection action by reversing the power flow across the bidirectional connection from the first battery of the wearable battery-operated device to the second battery of the portable charging case, wherein the bidirectional connection enables the first battery of the wearable battery-operated device to return energy back to and charge the second battery of the portable charging case.

13. The method of claim 12, wherein detecting the battery condition that indicates the threat to the first battery's health comprises detecting at least one of:

that the wearable battery-operated device has exceeded a threshold temperature;

that the first battery has exceeded the threshold temperature; or that the first battery is fully charged.

14. The method of claim 12, wherein the wearable battery-operated device comprises at least one of earbuds, a true wireless stereo headset, a head-mounted display, or smart glasses.

15. The method of claim 12, wherein a capacity of the second battery of the portable charging case is higher than a capacity of the first battery of the wearable battery-operated device.

16. The method of claim 12, wherein the reverse power flow being configured to return energy back to the portable charging case prevents a loss of energy as heat.

17. The method of claim 12, wherein the wearable battery-operated device operates using a Li-ion battery.

18. The method of claim 12, wherein the portable charging case operates using a Li-ion battery.

19. The method of claim 12, wherein a battery of the portable charging case is sized to charge a battery of the wearable battery-operated device multiple times.

20. A system comprising:

a wearable battery-operated device comprising a first battery;

a portable charging case that is designed to charge the wearable battery-operated device while storing the wearable battery-operated device and comprising a second battery; and a processor configured to:

charge the first battery using a power flow across a bidirectional connection from the second battery to the first battery;

detect a battery condition of the first battery that indicates a threat to the first battery's health; and in response to detecting the battery condition, reverse the power flow across the bidirectional connection from the first battery to the second battery to return energy back to the second battery from the first battery.

* * * * *